(12) United States Patent
Kanei et al.

(10) Patent No.: US 11,148,325 B2
(45) Date of Patent: Oct. 19, 2021

(54) DUST STOP DEVICE FOR SEALED KNEADER

(71) Applicant: Kobe Steel, Ltd., Hyogo (JP)

(72) Inventors: Naofumi Kanei, Takasago (JP); Koichi Miyake, Takasago (JP); Hikaru Hamada, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 506 days.

(21) Appl. No.: 16/095,951

(22) PCT Filed: Apr. 27, 2017

(86) PCT No.: PCT/JP2017/016724
§ 371 (c)(1),
(2) Date: Oct. 24, 2018

(87) PCT Pub. No.: WO2017/195622
PCT Pub. Date: Nov. 16, 2017

(65) Prior Publication Data
US 2019/0143563 A1      May 16, 2019

(30) Foreign Application Priority Data
May 13, 2016    (JP) ............................. JP2016-096913

(51) Int. Cl.
*B29B 7/00*      (2006.01)
*B29B 7/22*      (2006.01)
(Continued)

(52) U.S. Cl.
CPC .................. *B29B 7/22* (2013.01); *B01F 7/04* (2013.01); *B01F 7/047* (2013.01); *B01F 15/00* (2013.01);
(Continued)

(58) Field of Classification Search
CPC ......... B29B 7/7495; B29B 7/22; B29B 7/183; B29B 7/186; B01F 2015/00084;
(Continued)

(56) References Cited

U.S. PATENT DOCUMENTS

| 4,071,253 A | 1/1978 | Heinen et al. |
| 4,633,976 A | 1/1987 | Waki et al. |

(Continued)

FOREIGN PATENT DOCUMENTS

| JP | S52-110364 A | 9/1977 |
| JP | S60-038114 A | 2/1985 |

(Continued)

OTHER PUBLICATIONS

Machine translation of JP 5 826649 to Nakai (Year: 2015).*
(Continued)

*Primary Examiner* — Anshu Bhatia
(74) *Attorney, Agent, or Firm* — Studebaker & Brackett PC

(57) ABSTRACT

Provided is a dust stop device for a sealed kneader, the device being capable of excellent supply of lubricating oil. The sealed kneader includes a pair of rotors and a supporting member. The dust stop device includes a rotating ring attached to each rotor and a stationary ring attached to the supporting member. Both the rings have respective contact surfaces which make surface contact with each other. The stationary ring has a lubricating-oil supply portion with a through-hole. A part of the through-hole, the part including a part opened in the contact surface, is a long hole extending along a circumferential direction of rotation of the rotating ring.

4 Claims, 6 Drawing Sheets

(51) Int. Cl.
  *B29B 7/18* (2006.01)
  *B01F 15/00* (2006.01)
  *F16J 15/34* (2006.01)
  *B01F 7/04* (2006.01)
  *B29B 7/74* (2006.01)

(52) U.S. Cl.
  CPC .............. *B29B 7/183* (2013.01); *B29B 7/186* (2013.01); *F16J 15/3404* (2013.01); *B01F 2015/00084* (2013.01); *B01F 2015/00116* (2013.01); *B01F 2215/0049* (2013.01); *B29B 7/7495* (2013.01)

(58) Field of Classification Search
  CPC .. B01F 7/04; B01F 15/00; B01F 2015/00116; B01F 2215/0049; F16J 15/3404
  See application file for complete search history.

(56) References Cited

U.S. PATENT DOCUMENTS

| | | | |
|---|---|---|---|
| 6,325,378 | B1 | 12/2001 | Okumachi et al. |
| 2001/0052673 | A1 | 12/2001 | Okumachi et al. |
| 2010/0270749 | A1 | 10/2010 | Oshii et al. |
| 2011/0267919 | A1 | 11/2011 | Naoi et al. |

FOREIGN PATENT DOCUMENTS

| | | | |
|---|---|---|---|
| JP | S61-029467 | Y2 | 8/1986 |
| JP | S62-037573 | A | 2/1987 |
| JP | H02-032014 | B2 | 7/1990 |
| JP | H10-230153 | A | 9/1998 |
| JP | H11-287331 | A | 10/1999 |
| JP | 2013-154487 | A | 8/2013 |
| JP | 5826649 | B2 | 12/2015 |
| JP | 2019-042701 | A | 3/2019 |
| WO | 2009/066664 | A1 | 5/2009 |

OTHER PUBLICATIONS

Extended European Search Report issued by the European Patent Office dated Aug. 30, 2019, which corresponds to EP17795983.0-1014 and is related to U.S. Appl. No. 16/095,951.

International Preliminary Report on Patentability issued in corresponding International Application No. PCT/JP2017/016724; dated Nov. 22, 2018.

* cited by examiner

DUST STOP DEVICE FOR SEALED KNEADER

TECHNICAL FIELD

The present invention relates to a dust stop device provided in a sealed kneader to prevent a matter to be kneaded in the sealed kneader from leak to the outside of the sealed kneader.

BACKGROUND ART

There is a conventionally known batch-type sealed kneader for kneading a material to be kneaded such as rubber, plastic, or the like, the kneader including a housing enclosing a kneading chamber and a pair of rotors provided in the housing and rotatably supported by the housing. The pair of rotors are rotated to thereby knead a material to be kneaded such as rubber, plastic, or the like which is pressed into the kneading chamber. The matter thus having been brought into desired kneaded state is discharged to the outside of the housing.

The housing enclosing the kneading chamber (hollow portion) is supported by frame members disposed on axial both sides thereof. Each of the paired rotors has a main body housed in the kneading chamber to knead a material to be kneaded and a pair of shaft portions axially protruding from opposite end surfaces of the main body, the pair of shaft portions further protruding to the outside beyond the frame members.

To allow the main body of each of the rotors to rotate in the kneading chamber, a predetermined gap is given between the end surface of the main body and the frame member. The kneading chamber is communicated with the outside through the gap. This generates a possibility that the matter to be kneaded in the kneading chamber leaks out through the gap.

To prevent the leak, a conventional sealed kneader further includes a dust stop device which prevents a kneaded matter in a kneading chamber from leaking outside. The dust stop device includes a member which makes respective surface contacts with the main body of the rotor and the frame member so as to seal the kneading chamber. The rotation of the main body, therefore, involves a sliding movement of the contact surface of the member in contact with the main body. The sliding movement between the contact surface of the member and the contact surface of the main body of the rotor causes frictional force, which may heavily heat and/or abrade the dust stop device, if being large. This causes the necessity for supply of lubricating oil between the contact surfaces to reducing the frictional force.

Examples of such a dust stop device to which lubricating oil can be supplied are disclosed in the following Patent Document 1 and Patent Document 2.

The Patent Document 1 (JP S61-29467 Y2) discloses a crimping dust stop assembly for a kneader, the crimping dust stop assembly including an annular end plate which forms a flange end surface of a rotor to take in a rotor shaft, and an annular dust stop ring which is interposed between an outer circumference surface of the rotor shaft and an inner circumference of the end plate and pressed to the flange end surface through a yoke to be prevented from rotation. The dust stop ring is divided into a first ring and a second ring which are assembled so as to allow respective divisional end surfaces thereof to be joined and separated freely. Each of the first ring and the second ring has an outer circumference surface formed with a conductive jacket allowing a cooling water to be circumferentially flowed therein. The dust stop assembly further includes a communication pipe providing communication between the conductive jackets of the first and second rings, a cooling water supply pipe connected to one of the conductive jackets, and a cooling water discharge pipe connected to the other conductive jacket. Each of the first and second rings is formed with an axial lubricant hole for supplying lubricating oil to respective sliding contact parts of the first and second rings therethrough, the sliding contact parts making contact with the flange end surface.

Patent document 2 (JP H02-32014 B2) discloses a device formed of synthetic resin, rubber, etc. and constituted to shaft-seal a rotor shaft of a kneader. In the kneader, a narrow gap is maintained between an end plate and the rotor shaft. The device includes a seal ring movable along the rotor shaft, an O-ring embedded between the seal ring and the rotor shaft, and a spring which presses the seal ring against the end plate. The seal ring is fabricated from a material having self-lubricating properties.

Each of the dust stop devices disclosed in the Patent Documents 1 and 2 includes an annular stationary ring provided in a housing side, and an annular rotating ring which rotates along with a main body of a rotor. The stationary ring and the rotating ring have respective contact surfaces which make surface contact with each other so as to seal a kneading chamber, and the contact surfaces (seal surfaces) slide relatively to each other when the rotor is rotated. To reduce abrasion of thus sliding two rings, lubricating oil is supplied between the contact surfaces through lubricating-oil supply portion (supply port) provided in the stationary ring.

There is, however, a possibility that the rotation of the rotor for kneading hinders the lubricating oil from being excellently supplied to the entire region of the contact surfaces. Specifically, the rotation of the rotor for kneading causes centrifugal force, which increases the amount of lubricating oil moving radially outward on the contact surface of the rotating ring, thereby reducing the amount of lubricating oil supplied radially inward. This may promote abrasions or burns of both the rings to cause the dust stop device to be damaged.

CITATION LIST

Patent Documents

Patent Document 1: JP S61-29467 Y2
Patent Document 2: JP H02-32014 B2

SUMMARY OF INVENTION

The object of the present invention is to provide a dust stop device for a sealed kneader, the device including a stationary ring and a rotating ring which have respective contact surfaces making contact with each other and being capable of excellent supply of lubricating oil to the contact surfaces.

Provided is a dust stop device provided in a batch-type sealed kneader including a pair of rotors and a support member, the pair of rotors disposed adjacent to each other with a predetermined gap therebetween so as to have respective axes parallel to each other and being capable of rotating in opposite directions to each other, the supporting member including a housing that houses the pair of rotors and rotatably supporting axially opposite end portions of each of the pair of rotors, the dust stop device being interposed between each rotor and the supporting member to prevent a matter kneaded by the pair of rotors from leaking outside, the dust stop device including a rotating ring attached to the rotor so as to rotate with the rotor and a stationary ring attached to the supporting member. The stationary ring and the rotating ring have respective contact surfaces which make surface contact with each other while being opposed to each other. The stationary ring has a lubricating-oil supply portion which supplies lubricating oil to the respective contact surfaces of the stationary ring and the rotating ring. The lubricating-oil supply portion has a through-hole which provides communication between the contact surface of the stationary ring and a surface opposite to the contact surface. At least a part of the through-hole, the part including an opening in the contact surface, is a long hole which extends along a circumferential direction of rotation of the rotating ring. The long hole has a longitudinal direction that is coincident with a rotation tangent direction of the rotating ring or inclined to the rotation tangent direction such that the long hole is displaced inward in a radial direction of the rotation of the rotating ring with an advance in a rotational direction of the rotating ring, the rotation tangent direction being a direction of a tangent to the rotational direction of the rotating ring at an intermediate position of the long hole with respect to the longitudinal direction of the long hole.

DESCRIPTION OF EMBODIMENTS

There will be described below an embodiment of the present invention with reference to the drawings. The embodiment to be described below is one specific example of the present invention, and the specific example is not construed to limit a constitution of the present invention. Accordingly, a technical scope of the present invention is not limited to the disclosure on the present embodiment.

Figure 1:
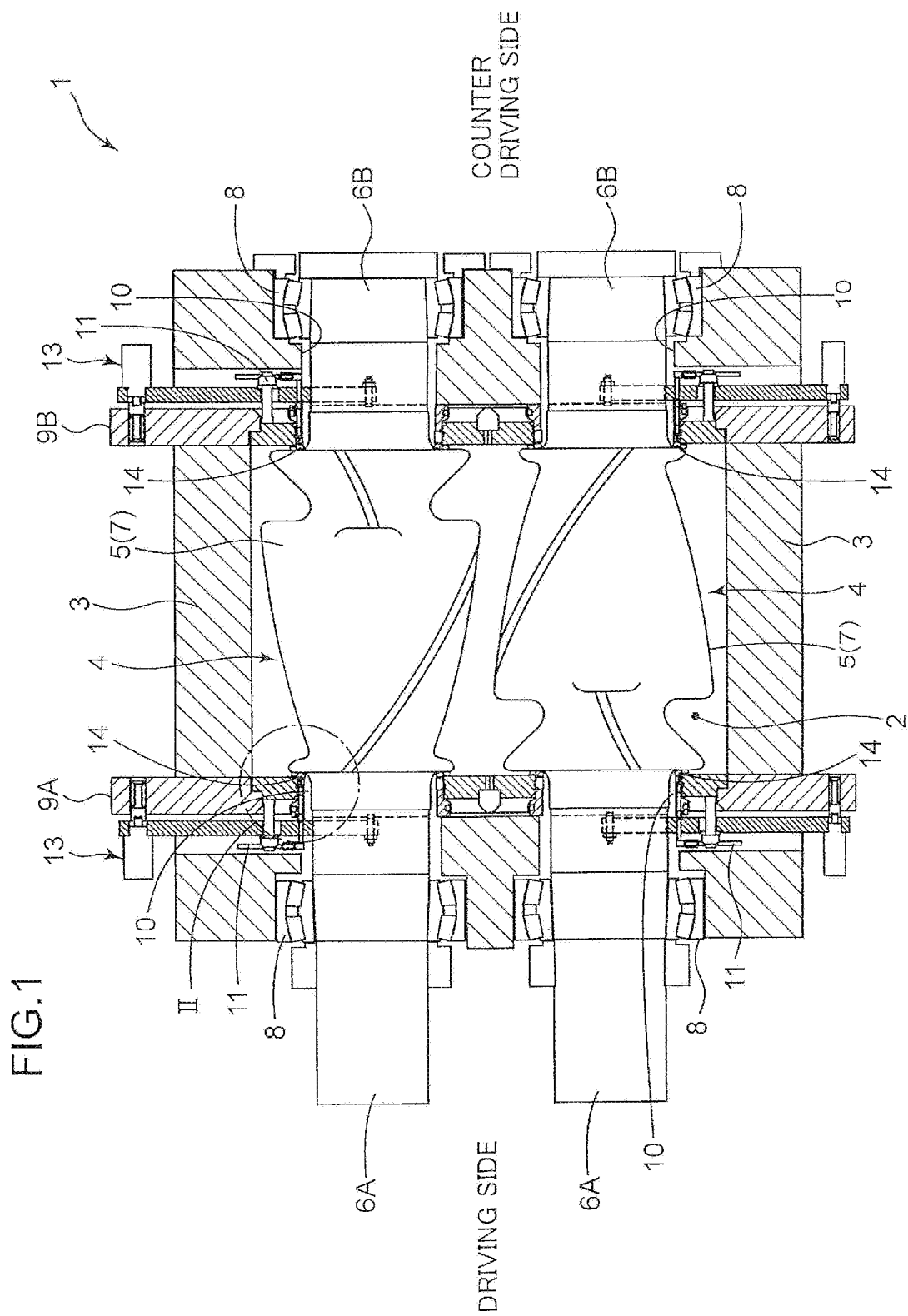
FIG. 1 is a sectional plan view schematically showing a structure of a kneading portion of a sealed kneader according to an embodiment of the present invention.

FIG. 1 is a sectional plan view showing a batch-type sealed kneader 1 according to an embodiment of the present invention. The left side of the sheet of FIG. 1 corresponds to the "driving side" of the sealed kneader 1 and the right side of the sheet corresponds to the "counter driving side" of the sealed kneader 1. In FIG. 1, which is a sectional plan view, an upper side of the sheet of FIG. 1 corresponds to the "left side in a width direction" of the sealed kneader 1, and the lower side of the sheet corresponds to the "right side in the width direction" of the sealed kneader 1. The front side in a normal direction on the sheet of FIG. 1 corresponds to the "upper side" of the sealed kneader 1 and the rear side in the normal line direction corresponds to a "lower side".

As shown in FIG. 1, the sealed kneader 1 includes a pair of rotors 4, a housing 3, and a pair of supporting frames 9A and 9B. The paired rotors 4 are disposed adjacent to each other with a predetermined gap therebetween in a right and left direction so as to have respective axes parallel to each other. The housing 3 encloses a kneading chamber 2 and houses the pair of rotors 4 in the kneading chamber 2. The paired supporting frames 9 are disposed on axial both sides of the housing 3 and constitutes a supporting member in association with the housing 3, the supporting member supporting the pair of rotors 4 rotatably. The paired rotors 4 kneads a material to be kneaded such as rubber, plastic, or the like pressed in the kneading chamber 2 through their rotations in respective directions opposite to each other and discharge the kneaded matter brought thereby into a desired kneaded state to the outside of the housing 3.

Each of the paired rotors 4 includes a main body 5 which kneads a material to be kneaded and a pair of shaft portions 6A and 6B protruding axially of the main body 5 from opposite end surfaces of the main body. The main body 5 and pair of shaft portions 6A and 6B are integrally formed. The shaft portions 6A and 6B, which correspond to the axially opposite end portions of each rotor 4, are rotatably supported in the housing 3 through respective bearings 8. The main body 5 is rotatable together with the shaft portion 6 thus supported through the bearing 8.

Each of the main body 5 has an outer circumference surface formed with a blade 7 for kneading a material to be kneaded. The blade 7 of each of the rotor 4 has a shape twisted relatively to an axis direction (axial line). Specifically, in order to sufficiently knead a material to be kneaded which is pressed into the kneading chamber 2, the shape of the blade 7 is set so as to make the direction of the axial flow of the blade 7 formed in the main body 5 of the right side rotor 4 and the direction of the axial flow of the blade 7 formed in the main body 5 of the left side rotor 4 be opposite to each other.

Regarding the shaft portions 6A and 6B, the shaft portion 6B on the counter driving side does not protrude to the outside of the housing 3, whereas the shaft portion 6A on the driving side protrudes axially outward beyond the housing 3. To the shaft portion 6A is connected a not-graphically-shown driving mechanism for driving the rotor 4. The driving mechanism generates a rotational driving force and inputs it to the pair of rotors 4 to thereby rotationally drive the pair of rotors 4 in directions opposite to each other.

The kneader 2 is enclosed by the housing 3 with respect to a radial direction thereof, while being opened to both of the driving side and the counter driving side with respect to the axial direction of the rotor 4. In other words, the housing 3 has a tubular main body portion enclosing the kneading chamber 2 while opened in the axial direction of the rotor 4. Specifically, the kneading chamber 2 has a shape in which a pair of cylindrical cavities are arranged right and left in parallel to each other with a partial overlap of respective outer circumferences of the paired cavities. In short, the kneading chamber 2 has a section orthogonal to the axis of the rotor 4, the section having a cocoon-shape arranged in the right and left (width) directions.

The paired rotors 4 are provided in the paired cavities (space), respectively, so as to make the axis of the cavity generally coincident with the axis of each rotor 4. The paired rotors 4 are, thus, arranged in parallel to each other and right and left adjacent to each other in the kneading chamber 2 having such a shape as described above. Although not graphically shown, an opening portion opened upward is provided on an upper part of the kneading chamber 2. Above the opening portion is provided a material guide path which guides a material to be kneaded vertically. Above the material guide path is provided an openable hopper (input slot). In the above-described sealed kneader 1, a material to be kneaded which is obtained by mixing a base material such as rubber, plastic, or the like with an additive is input from the hopper, and then the material is guided by the material guide path through the opening portion to be pushed in the kneading chamber 2.

The material to be kneaded which has been pressed in the kneading chamber 2 is kneaded by the blades 7 of the main body 5, the blades 7 being twisted in the same direction and rotating in the rotation directions opposite to each other so as to sweep an inner wall of the kneading chamber 2. The kneaded matter is discharged to the outside of the kneading chamber 2 through a discharge port (not shown) formed on the lower side of the kneading chamber 2. After the kneaded matter is discharged, the discharge port of the kneading chamber 2 is blocked and a material to be kneaded at a next batch is input from the hopper and pressed into the kneading chamber 2. Through the repetition of such a batch-type kneading cycle, kneading is performed in the above-described sealed kneader 1.

The paired supporting frames 9A and 9B support the housing 3 at opposite end portions thereof in the axis direction of the housing 3. The frame members 9A and 9B, each being formed of a plate member having a given thickness, are coupled to respective end portions of the housing 3 on the driving side and the counter driving side. Specifically, the paired frame members 9A and 9B support the housing 3, which is opened to both of one end side and the other end side, so as to axially close the kneading chamber 2 inside the housing 3. In short, the paired frame members 9A, 9B are disposed so as to sandwich the kneading chamber 2 in the axial direction.

Each of the paired frame members 9A and 9B is provided with a pair of through-holes 10, in which the shaft portions 6A and the shaft portions 6B of the pair of rotors 4 are inserted, respectively. Specifically, the shaft portions 6B on the counter driving side are inserted through the pair of through-holes 10 of the frame member 9B positioned on the counter driving side of the housing 3, and the shaft portions 6A on the driving side are inserted through the pair of through-holes 10 of the frame member 9A positioned on the driving side of the housing 3. The shaft portions 6A and 6B of each rotor 4 are, thus, arranged so as to protrude axially from the end surfaces of the main body 5 of the rotor 4 to the outside of the frame members 9A and 9B through the through-holes 10 formed in the frame members 9A and 9B.

Although the kneading chamber 2 is basically enclosed by the pair of frame members 9A and 9B and the housing 3, a small gap is provided between the axial end surfaces of the main body 5 of each rotor 4 disposed in the kneading chamber 2 and respective inner surfaces of the frame members 9A and 9B, i.e., respective wall surfaces facing the kneading chamber 2, in order to allow the main body 5 to rotate. This generates a possibility of leak of a kneaded matter in the kneading chamber 2 to the outside of the kneading chamber 2 through the gap. To prevent the leak (flow-out) of a kneaded matter through the gap, the sealed kneader 1 further includes a plurality of dust stop devices 14.

Each of the dust stop devices 14 is disposed in the above gap so as to interrupt communication between the inside and the outside of the kneading chamber 2 to keep the kneading chamber 2 sealed. In such a sealed kneader 1 having the pair of rotors 4 arranged in the kneading chamber 2 as shown in FIG. 1, the dust stop device 14 is provided to each of the axial end portions of each rotor 4, namely, the shaft portions 6A and 6B. In summary, according to the embodiment shown in FIG. 1, the dust stop devices 14 are provided at a total of four positions corresponding to the shaft portions 6A on the driving side and the shaft portions 6B on the counter driving side of the pair of rotors 4, respectively.

Figure 2:
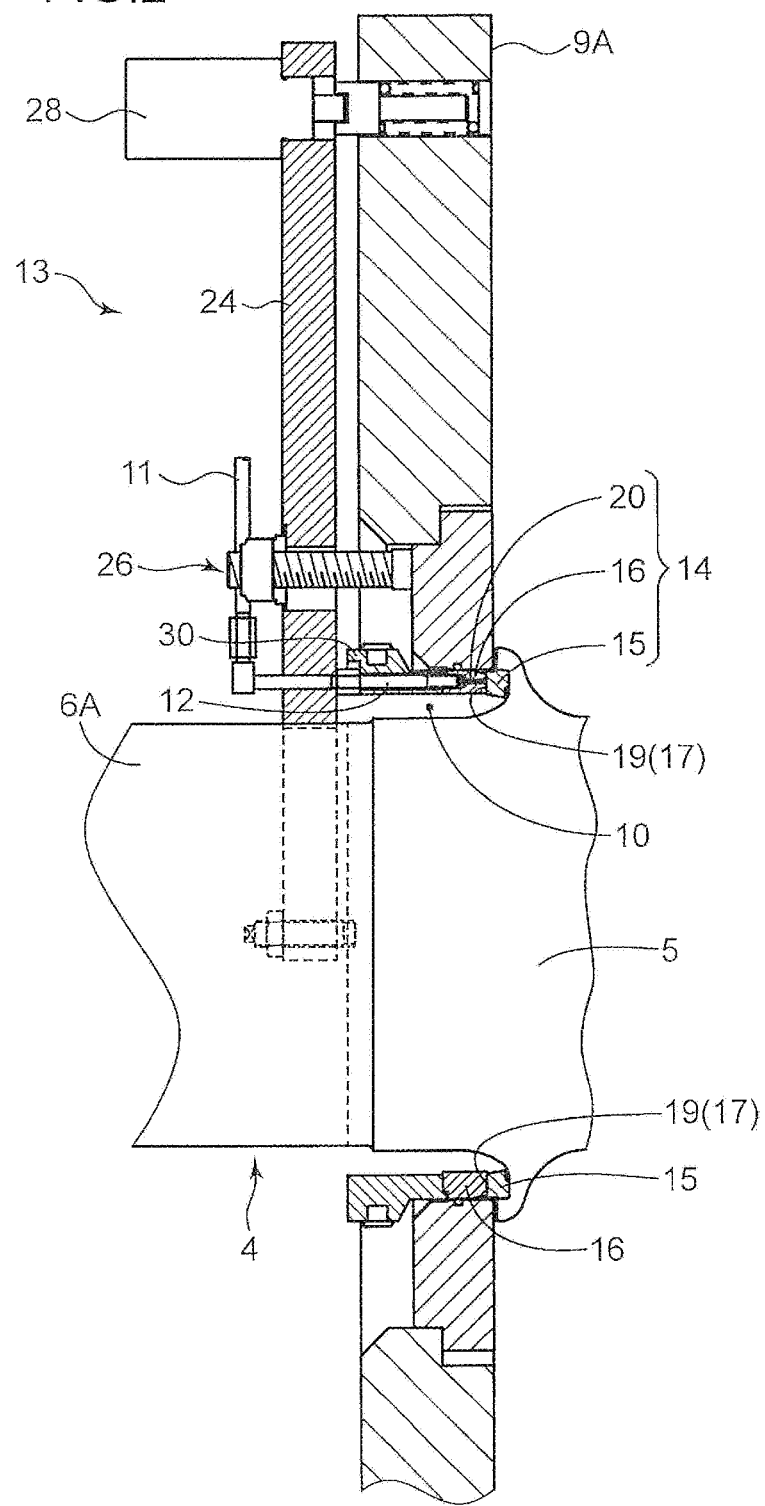
FIG. 2 is a sectional plan view showing structures of a dust stop device and surroundings of the dust stop device of the sealed kneader shown in FIG. 1, the view showing structures of a part enclosed in a circle II and surroundings of the part in FIG. 1.
Figure 3:
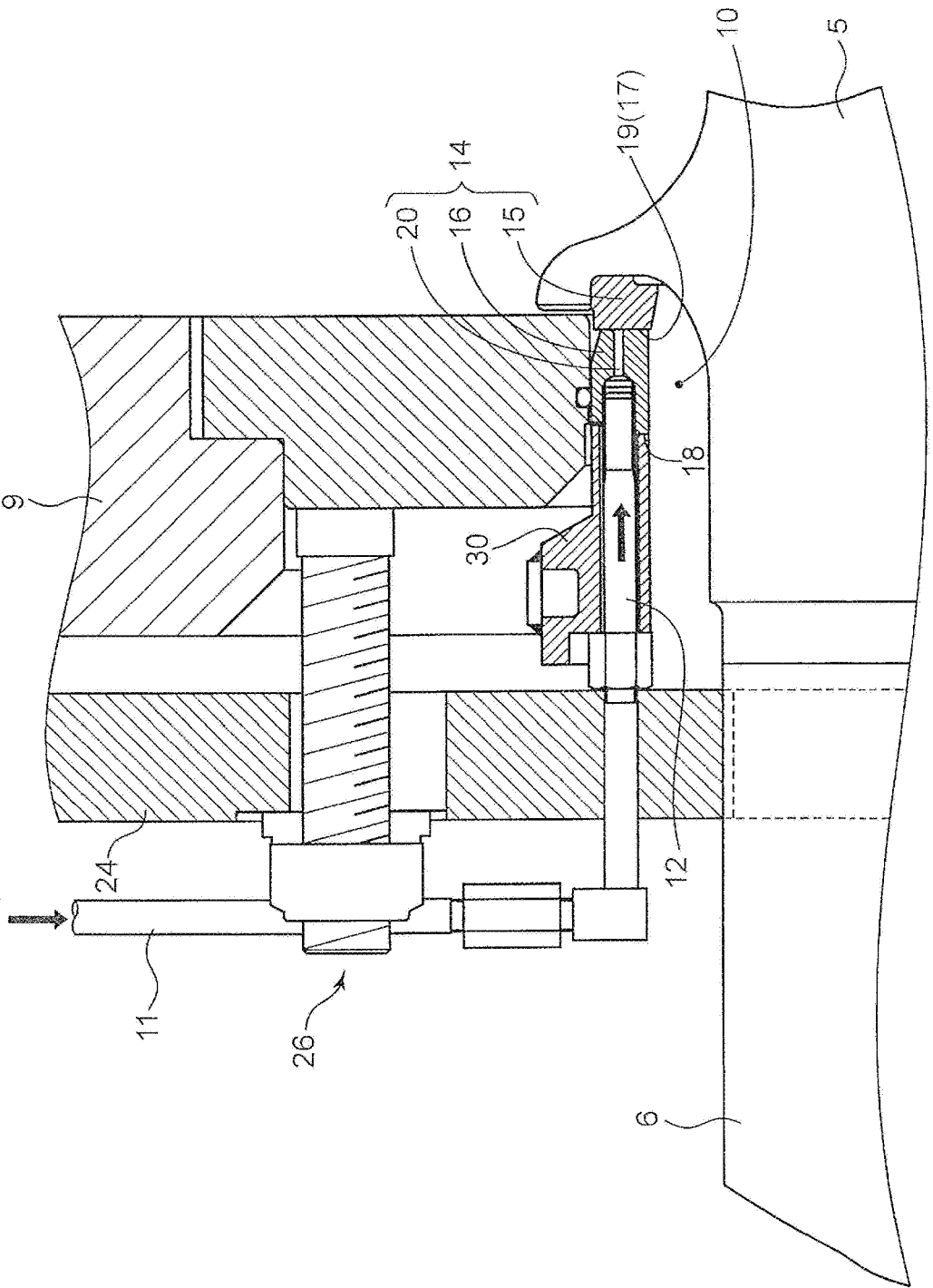
FIG. 3 is a sectional plan view showing an expansion of the dust stop device, the view showing an expansion of the part enclosed in the circle II.

In the following, description of the dust stop device 14 will be made focusing on a part enclosed in a circle II in FIG. 1. FIG. 2 is a sectional plan view showing an expansion of the part enclosed in the circle II and the vicinity thereof, the view showing the entire dust stop device 14. FIG. 3 is a sectional plan view showing an expansion of only the part enclosed in the circle II, the view showing main parts of the dust stop device 14, including lubricating oil supply path.

In detail, the dust stop device 14 includes a member to make surface contact with the end surface of the main body 5 (a part positioned in a boundary between the main body 5 and the shaft portion 6) of the rotor 4 rotating in the kneading chamber 2, and a member to make surface contact with the inner surface of each of the frame members 9A and 9B which are coupled to the housing 3 and support the shaft portions 6A and 6B of the rotor 4, i.e., the wall surface facing the kneading chamber 2, respectively. In short, the dust stop device 14 is disposed along respective inner circumference surfaces of the supporting frames 9A and 9B which surfaces enclose the through-holes 10 through which the shaft portions 6A and 6B of the rotor 4 pass through, respectively.

Specifically, as shown in FIG. 2 and FIG. 3, the plurality of dust stop devices 14 are provided for the shaft portions 6A and 6B of each rotor 4, respectively. Each dust stop device 14 includes a rotating ring 15 attached to each rotor 4 so as to rotate along with the rotor 4 and a stationary ring 16 attached to each of the frame members 9A and 9B constituting the supporting member. The rotating ring 15 and the stationary ring 16 have respective contact surfaces 17 and 19 making surface contact with each other. Involved by the rotation of the rotor 4, the contact surfaces 17 and 19 relatively slide in the rotation direction of the rotor 4 with close contact with each other. To the contact surfaces 17 and 19 thus sliding on each other is supplied lubricating oil for reducing abrasion of the contact surfaces 17 and 19.

The rotating ring 15 is fixed to the axial end surface of the main body 5 of each rotor 4 and rotates along with the rotor 4. In the example shown in FIG. 3, the end surface of the blade 7 of the main body 5 in the rotor 4, the part positioned most axially outward, is formed with a ring-shaped groove around an axis equivalent to the axis of the rotor 4, and the rotating ring 15 is press-fitted into the ring-shaped groove. The rotating ring 15 according to the present embodiment is an annular thin plate member having an outer diameter substantially equal to or slightly larger than the inner diameter of the ring-shaped groove, and is attached to the rotor 4 so as to be fitted into the ring-shaped groove.

The rotating ring 15, alternatively, can be an annular thin plate member having an inner diameter substantially equal to or slightly smaller than the outer diameter of each of the shaft portions 6A and 6B to be capable of being attached to the rotor 4 so as to fit with the outer circumference surface of a proximal end portion of the shaft portion 6 (that is, a portion adjacent to the main body 5).

The rotating ring 15 has a radial thickness substantially equal to that of the stationary ring 16 which will be described later. The rotating ring 15 and the stationary ring 16 according to the embodiment have respective inner diameters and outer diameters substantially equal to each other. Besides, the rotating ring 15 has an axial length (thickness) enough to securely block the gap.

The stationary ring 16 is attached to each of the frame members 9A and 9B so as to rotate relatively to the rotating ring 15 and so as to lie along the inner circumference surface enclosing the through-holes 10 in the supporting frames 9A and 9B. The stationary ring 16 is located so as to be axially opposed to the rotating ring 15 attached to the end surface of the main body 5 of the rotor 4. Specifically, the stationary ring 16 is disposed such that the contact surface 19 of the stationary ring 16 and the contact surface 17 of the rotating ring 15 make surface contact with each other with their axial opposition.

As shown in FIG. 3, the stationary ring 16 is an annular thin plate member having an outer diameter substantially equal to or slightly larger than the inner diameter of the through-hole 10 to be attached to each of the frame members 9A and 9B so as to be fitted into the through-hole 10. In short, the stationary ring 16 is press-fitted into the through-hole 10 formed in each of the frame members 9A and 9B.

The stationary ring 16 according to the embodiment is not completely fixed to each of the frame members 9A and 9B but is attached to each of the frame members 9A and 9B so as to be displaceable in a direction parallel to the axial direction of the rotor 4 in the through-hole 10.

The sealed kneader 1 according to the embodiment further includes a pressing-force applying mechanism 13. The pressing-force applying mechanism 13 presses the stationary ring 16 attached to the frame member 9A or 9B as described above in a direction from the outside toward the inside of the kneading chamber 2, thereby bringing the contact surface 19 of the stationary ring 16 and the contact surface 17 of the rotating ring 15 into close contact with each other to more securely maintain the sealed state of the kneading chamber 2.

The pressing-force applying mechanism 13 includes a lever 24, a restraining tool 26, a pressing cylinder 28, and a pressing member 30. The lever 24 is disposed so as to extend radially of the rotor 4, having an inner end portion fixed to the frame member 9 at a position close to the axis of the rotor 4 and an outer end portion opposite to the inner end portion. The restraining tool 26 has a bolt and a nut; the bolt is disposed so as to make contact with the outer surface of each of the frame members 9A and 9B in a posture of passing through an intermediate part of the lever 24 while extending along the axial direction of the rotor 4; the nut is attached to the bolt to restrain the intermediate part of the lever 24 from outside. The pressing cylinder 28 has a cylinder main body attached to the outer end portion of the lever 24 and a rod displaceable in an expansion and contraction direction parallel to the axial direction of the rotor 4, the rod being attached to the supporting frames 9A, 9B. The pressing cylinder 28 displaces the outer end portion of the lever 24, through the extension of the rod, in a direction of separating the outer end portion from the supporting frame 9A or 9B, thereby displacing the inner end portion of the lever 24 in a pressing direction which is a direction of rendering the outer end portion to approach the supporting frame 9A or 9B. The pressing member 30 is interposed between the inner end portion of the lever 24 and the stationary ring 16 to press the contact surface 19 of the stationary ring 16 against the contact surface 17 of the rotating ring 15 with the displacement of the inner end portion in the pressing direction. Besides, the pressing member 30 is engaged with the stationary ring 16 to thereby hinder the stationary ring 16 from rotation in the same direction as that of the rotating ring 15.

The specific constitution of the pressing-force applying mechanism 13 is not limited. Moreover, the stationary ring 16 also can be completely fixed to each of the frame members 9A and 9B so as to allow a pressing-force applying mechanism to be omitted.

Each of the dust stop devices 14 includes at least one lubricating-oil supply portion 20. The lubricating-oil supply portion 20 is provided in the stationary ring 16 to supply lubricating oil to the whole of the contact surface 19 of the stationary ring 16 and the whole of the contact surface 17 of the rotating ring 15, the contact surface 17 sliding relatively to the contact surface 19. The shape of the lubricating-oil supply portion can be variably determined. Next will be described a first example and a second example regarding the specific shape of the lubricating-oil supply portion 20, with reference to FIG. 4 and FIG. 5, respectively.

Figure 4:
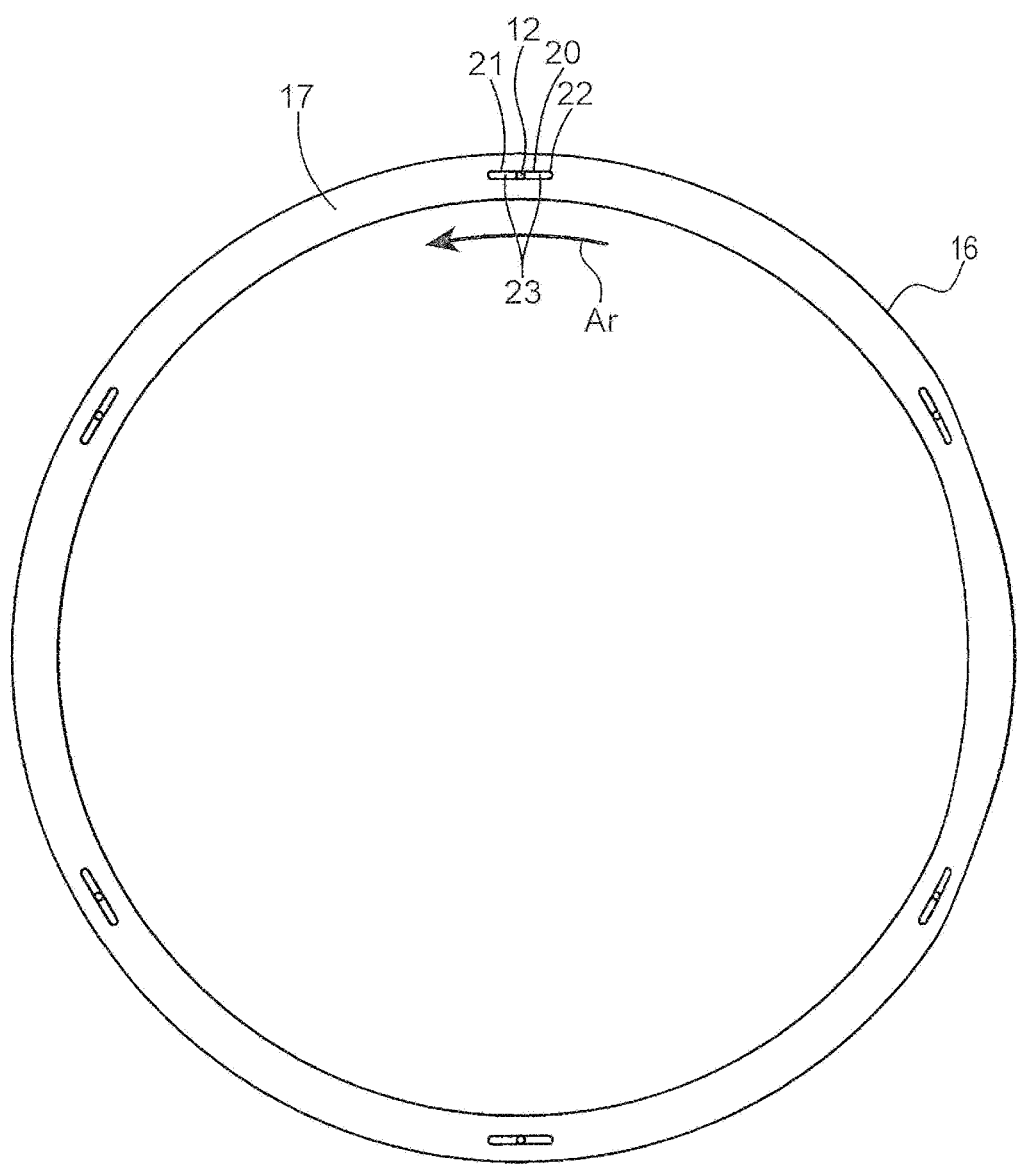
FIG. 4 is a front view of a stationary ring constituting the dust stop device, the view showing a first example of a lubricating-oil supply portion provided in the stationary ring.

FIG. 4 is a front view showing the stationary ring 16 including the lubricating-oil supply portion 20 according to the first example. The stationary ring 16 shown in FIG. 4 has a plurality of, specifically a total of six, lubricating-oil supply portions 20. The plurality of lubricating-oil supply portions 20 is circumferentially spaced at an equal interval in a front view. The plurality of lubricating-oil supply portions 20, however, also may be spaced at an uneven interval taking account of the flow of lubricating oil caused by centrifugal force due to rotation of the rotor 4. The stationary ring 16 only has to include at least one lubricating-oil supply portion 20; the number of the lubricating-oil supply portions 20 can be three, for example.

The lubricating-oil supply portion 20 is formed of a through-hole providing communication between the contact surface 19 of the stationary ring 16, which makes surface contact with the contact surface 17 of the rotating ring 15, and an outer surface 18 which is an axial end surface opposite to the contact surface 17. To the lubricating-oil supply portion 20 is connected a lubricating-oil supply device. The lubricating-oil supply device includes, for example, a not-graphically-shown pressure lubricator, lubricating oil supply pipe 11 connected to the pressure lubricator, and a supply nozzle 12 connected to the lubricating oil supply pipe 11. In the structure shown in FIG. 2 and FIG. 3, the supply nozzle 12 is disposed so as to axially pass through the pressing member 30, the front end portion of the supply nozzle 12 being inserted from the outer surface 18 into an inlet part (a left side part in FIG. 2 and FIG. 3) of the through-hole constituting the lubricating-oil supply portion 20.

An outlet part of the through-hole constituting the lubricating-oil supply portion 20, the outlet part including at least an opening in the contact surface 19, is a long hole extending in a circumferential direction of rotation of the rotating ring 15. The "long hole" in the present invention encompasses not only a long hole as shown in FIG. 4 but also a "slit-shaped hole" and an "elongated groove" extending in the circumferential direction of rotation. The longitudinal direction of the long hole constituting the lubricating-oil supply portion 20 is, thus, a direction along the direction of the tangent to the circumference of the stationary ring 16. Hereinafter, the longitudinal direction of the long hole is also referred to as a length direction, and a direction orthogonal to the longitudinal direction of the long hole is also referred to as a width direction of the long hole.

In other words, the long hole constituting the lubricating-oil supply portion 20 shown in FIG. 4 has such a shape that the length direction of the long hole is coincident with a rotation tangent direction which is the direction of the tangent to the rotational direction of the rotating ring 15 at an intermediate position with respect to the length direction of the long hole, i.e., the direction indicated by the arrow Ar in FIG. 4. Therefore, the radial distance from the center of the rotating ring 15 to one end portion 21 in the length direction of the long hole is equal to the radial distance from the center of the rotating ring 15 to the other end portion 22 in the length direction of the long hole.

The lubricating-oil supply portion 20 shown in FIG. 4 is provided, in the radial direction of the stationary ring 16, at a position generally intermediate between the inner circumference and the outer circumference of the stationary ring 16. Besides, the supply nozzle 12 disposed rearward of the lubricating-oil supply portion 20 is provided, in a front view of the stationary ring 16, at a central part of the long hole in the length direction and at a central part in the width direction. This position of the provided supply nozzle 12 is one example.

The lubricating-oil supply portion 20 has respective spaces positioned at right and left sides of the supply nozzle 12, i.e., at the both sides of the long hole in the length direction, that is, a left side part of the long hole on the contact surface 17 (a part including the end 21 on the downstream side of the rotating ring 15 in the rotation direction) and a right side part (a part including the end 22 on the upstream side of the rotating ring 15 in the rotation direction) in a view from the front as shown in FIG. 4, the spaces constituting a storage portion 23 which is a space for temporarily storing lubricating oil, namely, an oil reservation portion.

The lubricating-oil supply portion 20 only has to include a part (outlet part) including at least an opening (i.e. outlet) in the contact surface 17 of the stationary ring 16, the part being a long hole extending in the length direction; for example, the lubricating-oil supply portion 20 may include a part (inlet part) including an opening (i.e. inlet) in the outer surface 18 of the stationary ring 16, the part being not a long hole. The inlet part may be a simple round hole. Alternatively, the entire lubricating-oil supply portion 20 may be a long hole extending in the length direction over the thickness direction of the stationary ring 16 (the direction parallel to the axial direction of the rotor 4).

As described in the foregoing, the through-hole constituting the lubricating-oil supply portion 20 provided in the stationary ring 16, having a part which includes at least the opening in the contact surface 17 and is a long hole extending along the circumferential direction of the rotation of the rotating ring 15, allows lubricating oil supplied from the supply nozzle 12 to be temporarily stored in the storage portion 23 of the long hole, i.e., in the parts positioned at both sides of the supply nozzle 12, thereby enabling supply of lubricating oil to the contact surfaces 19 and 17 of the stationary ring 16 and the rotating ring 15 to be enhanced.

Figure 5:
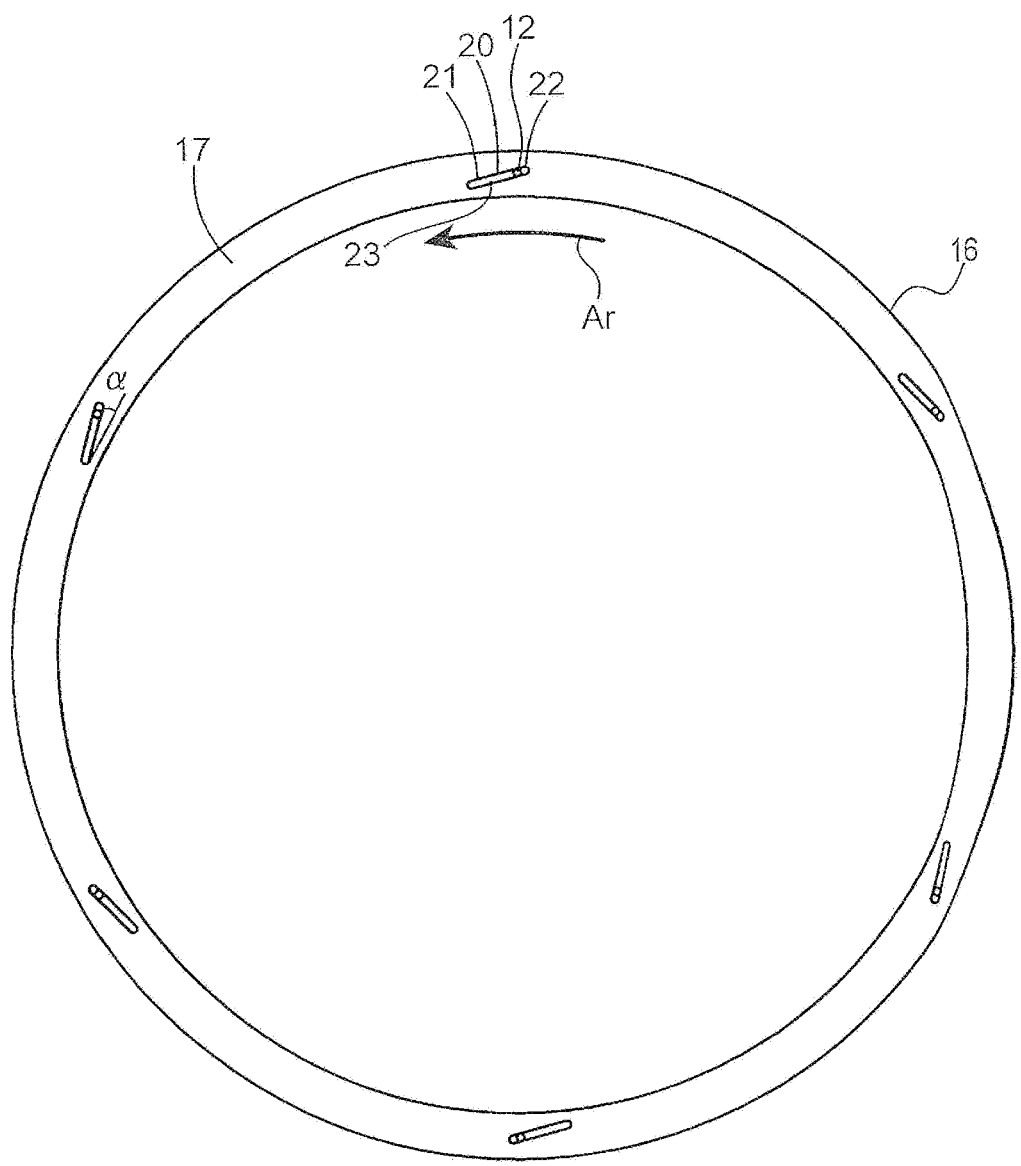
FIG. 5 is a front view of a stationary ring constituting the dust stop device, the view showing a second example of a lubricating-oil supply portion provided in the stationary ring.

FIG. 5 is a front view showing the stationary ring 16 including the lubricating-oil supply portion 20 according to the second example. The following description will be made mainly focusing on the lubricating-oil supply portion 20 positioned at an upper most part on the sheet of FIG. 5. Since the configuration of the lubricating-oil supply portion 20 according to the second example shown in FIG. 5 is the same as that of the lubricating-oil supply portion 20 according to the first example shown in FIG. 4, except for a shape of the lubricating-oil supply portion 20 in a front view, the description thereon is omitted. For example, although the stationary ring 16 shown in FIG. 5 also has a total of six lubricating-oil supply portions 20 spaced circumferentially at an equal interval, the stationary ring 16 only has to have at least one (e.g. three) lubricating-oil supply portion 20, the number and the position of the lubricating-oil supply portions 20 are not limited. For example, the plurality of lubricating-oil supply portions 20 may be spaced at an unequal interval taking account of a flow of lubricating oil caused by a centrifugal force of rotation of the rotor 4.

Similarly to the first example, the lubricating-oil supply portion 20 according to the second example shown in FIG. 5 is also a through-hole which provides communication between the contact surface 17 of the stationary ring 16 and a surface opposite to the contact surface 17, namely, the outer surface 18, in which an outlet part including at least an opening in the contact surface 17 of the stationary ring 16 is a long hole. Furthermore, in the lubricating-oil supply portion 20 according to the second example, differently from the first example, the length direction of the long hole is inclined to a rotation tangent direction, which is the direction of the tangent to the rotation of the rotating ring 15 at an intermediate position of the long hole in the length direction, such that the long hole approaches the inner circumference of the stationary ring 16 (that is, the long hole is displaced inward in the radial direction of the rotation) with an advance to the downstream side in the rotational direction.

Specifically, in the case where the rotation direction of the rotating ring 15 is a direction from the right side to the left side in the sheet of FIG. 5 (namely, counterclockwise direction) as indicated by the arrow Ar in FIG. 5, the length direction of the long hole is inclined at an inclination angle α to the rotation tangent direction of the rotating ring 16 at the intermediate position in the length direction of the long hole, such that the left end of the long hole constituting the lubricating-oil supply portion 20 (namely, the downstream end 21 in the rotation direction) is positioned so as to be close to the inner circumference of the stationary ring 16 than the right end (the upstream end 22 in the rotation direction) thereof. Therefore, the radial distance from the center of the rotating ring 15 to one end of the long hole (the downstream end 21 in the rotation direction) is larger than the radial distance from the center of the rotating ring 15 to the other end of the long hole (the upstream end 22 in the rotation direction).

As above, "the length direction of the long hole is a direction along the circumferential direction of the rotation of the rotating ring 15" also encompasses a case where the length direction is inclined, as shown in FIG. 5, to the rotation tangent direction. In other words, the long hole constituting the lubricating-oil supply portion 20 as shown in FIG. 5 has such a shape that the long hole gradually shifts from the outer circumference side to the inner circumference side of the stationary ring 16 with an advance in the rotational direction of the rotating ring 15 along the circumferential direction of the rotation of the rotating ring 15.

The inclination angle α, i.e., the angle that the axis of the long hole in the length direction forms with the rotation tangent direction of the rotating ring 15 at the intermediate position of the long hole in the length direction, is preferably larger than 0° and equal to or smaller than 45°, in consideration with an area of supply of lubricating oil to the contact surfaces 17 and 19. Furthermore, in consideration with the shape of the stationary ring 16 as shown in FIG. 4 and FIG. 5, the inclination angle α is preferably larger than 0° and equal to or smaller than 25°.

In the second example shown in FIG. 5, the supply nozzle 12 is disposed at a position closer to the right end, when the contact surface 17 of the stationary ring 16 is seen from the front (the upstream end 22 in the rotation direction), than the central position of the long hole. Therefore, in the long hole constituting the lubricating-oil supply portion 20, the part downstream of the supply nozzle in the rotation direction, i.e., the part from the middle part in the longitudinal direction to the left end (the downstream end 21 in the rotation direction) forms a storage portion 23 (oil reservation portion) for temporarily storing lubricating oil. This position of the provided supply nozzle 12 in the lubricating-oil supply portion 20 is also one example.

In this second example, a part of the lubricating oil supplied from the supply nozzle 12 is flowed outward radially of the rotation of the rotating ring 15 from the right end of the lubricating-oil supply portion 20, i.e., from the upstream end 22 in the rotation direction in FIG. 5 by the centrifugal force caused by the rotation of the rotating ring 15, thereby lubricating the respective contact surfaces 17 and 19 of the rotating ring 15 and the stationary ring 16. The remaining lubricating oil is flowed toward the inner circumference of the stationary ring 16 along the long hole and temporarily stored in the storage portion 23, lubricating the contact surfaces 19 and 17 on the inner circumference side of the stationary ring 16 and the rotating ring 15.

Hence, it is preferable that the length direction of the long hole constituting the lubricating-oil supply portion 20 is inclined to the rotation tangent direction of the rotating ring 15 at the intermediate position of the long hole in the length direction such that the long hole is displaced inward in the radial direction of the rotation of the rotating ring 15 with an advance in the rotation direction of the rotating ring 15. This enables lubricating oil to be supplied in a wider region of the contact surfaces 17 and 19.

Also in the second example, the lubricating-oil supply portion 20 only has to an outlet part including at least an opening (i.e. outlet) in the contact surface 17 of the stationary ring 16, the outlet part being a long hole extending in the length direction; for example, the lubricating-oil supply portion 20 may include an inlet part including an opening in the outer surface 18 of the stationary ring 16 (namely, inlet), the inlet part being not a long hole. The inlet part may be a simple round hole. Alternatively, the entire lubricating-oil supply portion 20 may be formed of a long hole extending in the length direction over the thickness direction of the stationary ring 16 (the direction parallel to the axial direction of the rotor 4).

Figure 6:
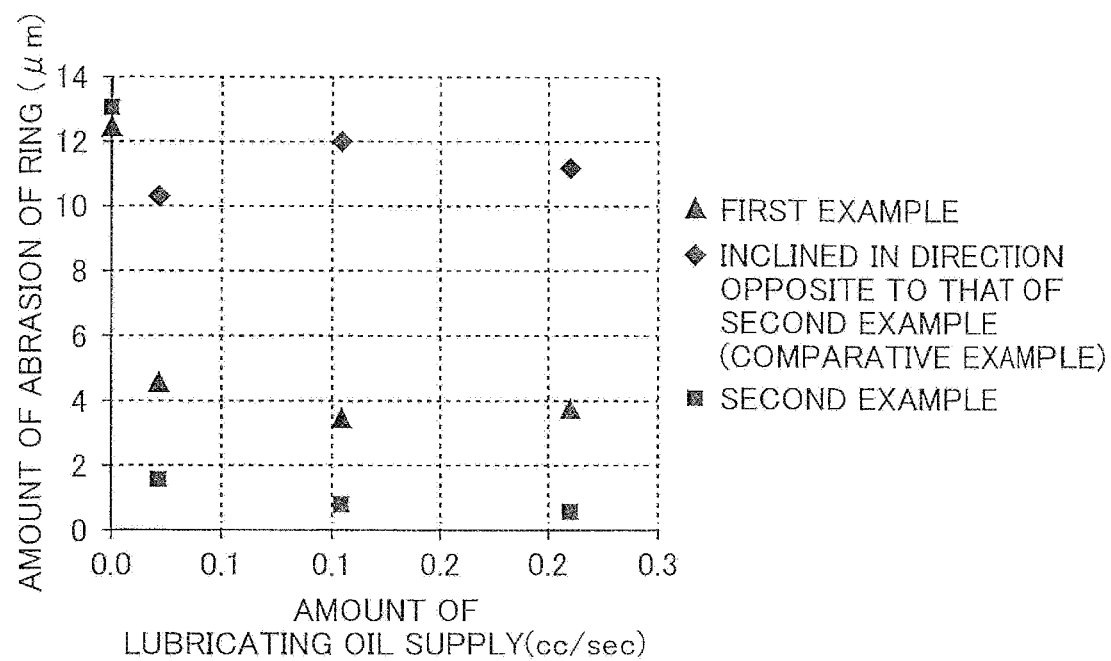
FIG. 6 is a view showing a relation between the amount of lubricating oil supplied to a contact surface by the lubricating-oil supply portion and the amount of abrasion of the dust stop device.

Next will be made description about functions and effects of the lubricating-oil supply portions 20 according to the first and second examples, on the basis of the result of an abrasion test of the stationary ring 16 shown in FIG. 6. FIG. 6 includes marks each indicated by ▲ which represent a result of an abrasion test conducted with respect to the first example, marks each indicated by ■ which represent a result of the abrasion test conducted with respect to the second example, and marks each indicated by ♦ which represent a result of an abrasion test conducted with respect to a comparative example in which the long hole constituting the lubricating-oil supply portion 20 is inclined, in the direction opposite to that in the second example, to the rotation tangent direction of the rotating ring 15 at the intermediate position of the long hole in the length direction.

As indicated by ▲ in FIG. 6, the amount of abrasion of the stationary ring 16 according to the first example when the lubricating oil is supplied at a flow rate of about 0.05 (cc/sec) is about 4.5 µm, the amount of abrasion of the stationary ring 16 when the lubricating oil is supplied at a flow rate of about 0.11 (cc/sec) is about 3.8 µm, and the amount of abrasion of the stationary ring 16 when the lubricating oil is supplied at a flow rate of about 0.22 (cc/sec) is about 3.9 µm. Thus, in the case where the long hole constituting the lubricating-oil supply portion 20 has the shape shown in FIG. 4, the amount of abrasion of the stationary ring 16 is kept in the neighborhood of 4 µm, which shows that an abrasion reduction effect is exhibited.

As indicated by ▲ in FIG. 6, the amount of abrasion of the stationary ring 16 according to the second example when the lubricating oil is supplied at a flow rate of about 0.05 (cc/sec) is about 1.9 µm, the amount of abrasion of the stationary ring 16 when the lubricating oil is supplied at a flow rate of about 0.11 (cc/sec) is about 1 µm, and the amount of abrasion of the stationary ring 16 when the lubricating oil is supplied at a flow rate of about 0.22 (cc/sec) is about 0.8 µm. Thus, in the case where the long hole constituting the lubricating-oil supply portion 20 has the shape shown in FIG. 5, the amount of abrasion of the stationary ring 16 is kept less than 2 µm, which shows that the amount of abrasion is further reduced than in the first example.

In contrast, as indicated by ♦ in FIG. 6, in the comparative example, i.e. in the example where the length direction of the long hole constituting the lubricating-oil supply portion 20 is inclined, in the direction opposite to that in the second example, to the rotation tangent direction of the rotating ring 15 at the intermediate position of the long hole in the length direction, the amount of abrasion of the stationary ring 16 when the lubricating oil is supplied at a flow rate of about 0.05 (cc/sec) is about 10.3 µm, the amount of abrasion of the stationary ring 16 when the lubricating oil is supplied at a flow rate of about 0.11 (cc/sec) is about 12 µm, and the amount of abrasion of the stationary ring 16 when the lubricating oil is supplied at a flow rate of about 0.22 (cc/sec) is about 11.5 µm. Thus, in the comparative example, the amount of abrasion of the stationary ring 16 exceeds 10 µm. This shows that the lubricating-oil supply portions 20 according to the first and second examples produce an extremely excellent abrasion reduction effect even compared with the lubricating-oil supply portion 20 according to the comparative example.

As above, the lubricating-oil supply portion 20 thus having such a shape as in the comparative example may allow the centrifugal force caused by rotation of the rotating ring 15 to flow almost all the lubricating oil supplied to the contact surface 19 to outside of the two sliding rings 15 and 16 to thereby cause oil shortage. In particular, it seems hard to supply the lubricating oil to the side of the inner circumference of the stationary ring 16.

In other words, the shape of the long hole of the lubricating-oil supply portion 20 according to the comparative example may bring the two rings 15 and 16 into heavy abrasion.

The embodiments disclosed in the foregoing are all for illustrative purpose only in any respect and are not to be construed as limiting. For example, the shape of the long hole constituting the lubricating-oil supply portion 20 is not limited to a so-called straight shape having a fixed length direction to extend linearly as a whole as shown in FIG. 4 and FIG. 5. The shape of the long hole, alternatively, can be one having a length direction varying with a position of the long hole, such as an arc or a boomerang, for example. Besides, the long hole can include a part other than a part extending along the circumferential direction of rotation. For example, the long hole can be given an L-shape cranked at an intermediate position thereof.

In particular, in the embodiments disclosed in the foregoing, not explicitly disclosed matters, for example, running conditions and operation conditions, various parameters, and a size, a weight and a volume of a component are within the general skill of a person skilled in the art, for which values that can be easily conceived by those skilled in the art are adopted.

As described in the foregoing, a dust stop device for a sealed kneader is provided, the device including a stationary ring and a rotating ring which have respective contact surfaces making contact with each other and being capable of excellent supply of lubricating oil to the contact surfaces. Provided is a dust stop device provided in a batch-type sealed kneader including a pair of rotors and a support member, the pair of rotors disposed adjacent to each other with a predetermined gap therebetween so as to have respective axes parallel to each other and being capable of rotating in opposite directions to each other, the supporting member including a housing that houses the pair of rotors and rotatably supporting axially opposite end portions of each of the pair of rotors, the dust stop device being interposed between each rotor and the supporting member to prevent a matter kneaded by the pair of rotors from leaking outside, the dust stop device including a rotating ring attached to the rotor so as to rotate with the rotor and a stationary ring attached to the supporting member. The stationary ring and the rotating ring have respective contact surfaces which make surface contact with each other while being opposed to each other. The stationary ring has a lubricating-oil supply portion which supplies lubricating oil to the respective contact surfaces of the stationary ring and the rotating ring. The lubricating-oil supply portion has a through-hole which provides communication between the contact surface of the stationary ring and a surface opposite to the contact surface. At least a part of the through-hole, the part including an opening in the contact surface, is a long hole which extends along a circumferential direction of the rotation of the rotating ring. The long hole has a longitudinal direction that is coincident with a rotation tangent direction of the rotating ring or inclined to the rotation tangent direction such that the long hole is displaced inward in a radial direction of the rotation of the rotating ring with an advance in a rotational direction of the rotating ring, the rotation tangent direction being a direction of a tangent to the rotational direction of the rotating ring at an intermediate position of the long hole with respect to the longitudinal direction of the long hole.

This dust stop device, which allows lubricating oil supplied to the lubricating-oil supply portion to move in the circumferential direction of the rotation of the rotating ring along the longitudinal direction of the long hole, enables the lubricating oil to be supplied in a wider region of the respective contact surfaces of the stationary ring and the rotating ring irrespective of centrifugal force caused by the rotation of the rotating ring.

The longitudinal direction of the long hole is, preferably, inclined to the rotation tangent direction such that the long hole is displaced inwardly in the radial direction of the rotation of the rotating ring with an advance in the rotation direction of the rotating ring. This allows the lubricating oil supplied to the lubricating-oil supply portion to be shifted inwardly in the radial direction of the rotation of the rotating ring irrespective of the centrifugal force, thereby enabling the lubricating oil to be supplied in a wider region.

In this case, it is preferable that the position at which the lubricating oil is supplied to the lubricating-oil supply portion is a position upstream of the intermediate position in the length direction of the long hole, in the rotation direction of the rotating ring. This makes it possible to increase a part of the long hole, the part being usable as a storage portion for temporarily storing the lubricating oil supplied as described above.

The longitudinal direction of the long hole constituting the lubricating-oil supply portion, alternatively, may be coincident with the rotation tangent direction of the rotating ring at the intermediate position in the longitudinal direction of the long hole.

The specific shape of the long hole of the lubricating-oil supply portion is not particularly limited. The shape may be, for example, a straight-shape, arc-shape, boomerang-shape, or L-shape.

Besides, also provided is a sealed kneader including: a pair of rotors arranged adjacent to each other with a predetermined gap therebetween so as to have respective axes parallel to each other and capable of rotating in opposite directions to each other; a supporting member including a housing that houses the pair of rotors and supporting axially opposite end portions of the pair of rotors rotatably; and the dust stop device interposed between each rotor and the supporting member to prevent a matter kneaded by the pair of rotors from leaking to the outside of the supporting member.

The invention claimed is:

1. A dust stop device for a sealed kneader, the dust stop device being provided in a sealed kneader having a pair of rotors and a supporting member, the pair of rotors being disposed adjacent to each other with a predetermined gap therebetween so as to have respective axes parallel to each other and being capable of rotating in opposite directions to each other, the supporting member including a housing that houses the pair of rotors and supporting axial end portions of the pair of rotors rotatably, the dust stop device being interposed between each rotor and the supporting member to prevent a matter kneaded by the pair of rotors from leaking to an outside of the supporting member, the dust stop device comprising:

a rotating ring attached to the rotor so as to rotate with the rotor; and a stationary ring attached to the supporting member, wherein:

the stationary ring and the rotating ring have respective contact surfaces which make surface contact with each other while being opposed to each other;

the stationary ring has a lubricating-oil supply portion which supplies lubricating oil to the respective contact surfaces of the stationary ring and the rotating ring;

the lubricating-oil supply portion has a through-hole which provides communication between the contact surface of the stationary ring and a surface opposite to the contact surface; and at least a part of the through-hole, the part including an opening in the contact surface, is a long hole which extends along a circumferential direction of rotation of the rotating ring, the long hole having a longitudinal direction that is inclined to the rotation tangent direction such that the long hole is displaced inward in a radial direction of the rotation of the rotating ring with an advance in a rotational direction of the rotating ring, the rotation tangent direction being a direction of a tangent to the rotational direction of the rotating ring at an intermediate position of the long hole with respect to the longitudinal direction of the long hole;

wherein the long hole has a downstream end and an upstream end respectively distanced from an inner circumference and an outer circumference of the stationary ring;

the stationary ring has a plurality of said lubricating-oil supply portions;

the long holes of the plurality of the lubricating-oil supply portions are spaced circumferentially at an interval; and the long holes of the plurality of the lubricating-oil supply portions are not overlapped to each other in the radial direction of the stationary ring.

2. The dust stop device for a sealed kneader according to claim 1, wherein the position at which the lubricating oil is supplied to the lubricating-oil supply portion is a position upstream of the intermediate position in the length direction of the long hole, in the rotation direction of the rotating ring.

3. The dust stop device for a sealed kneader according to claim 1, wherein the long hole of the lubricating-oil supply portion has a shape selected from a straight-shape, an arc-shape, a boomerang-shape, and an L-shape.

4. A sealed kneader comprising:

the dust stop device according to claim 1;

a pair of rotors disposed adjacent to each other with a predetermined gap therebetween so as to have respective axes parallel to each other and being capable of rotating in opposite directions to each other;

the supporting member including a housing that houses the pair of rotors and supporting axially opposite end portions of the pair of rotors rotatably; and the dust stop device being interposed between each rotor and the supporting member to prevent a matter kneaded by the pair of rotors from leaking to an outside of the supporting member.

* * * * *